June 2, 1970   R. M. FREEBORG   3,514,838
METHOD OF SEVERING A NUCLEAR FUEL BUNDLE
Filed July 15, 1966   2 Sheets-Sheet 1

INVENTOR.
ROBERT M. FREEBORG
BY
ATTORNEYS

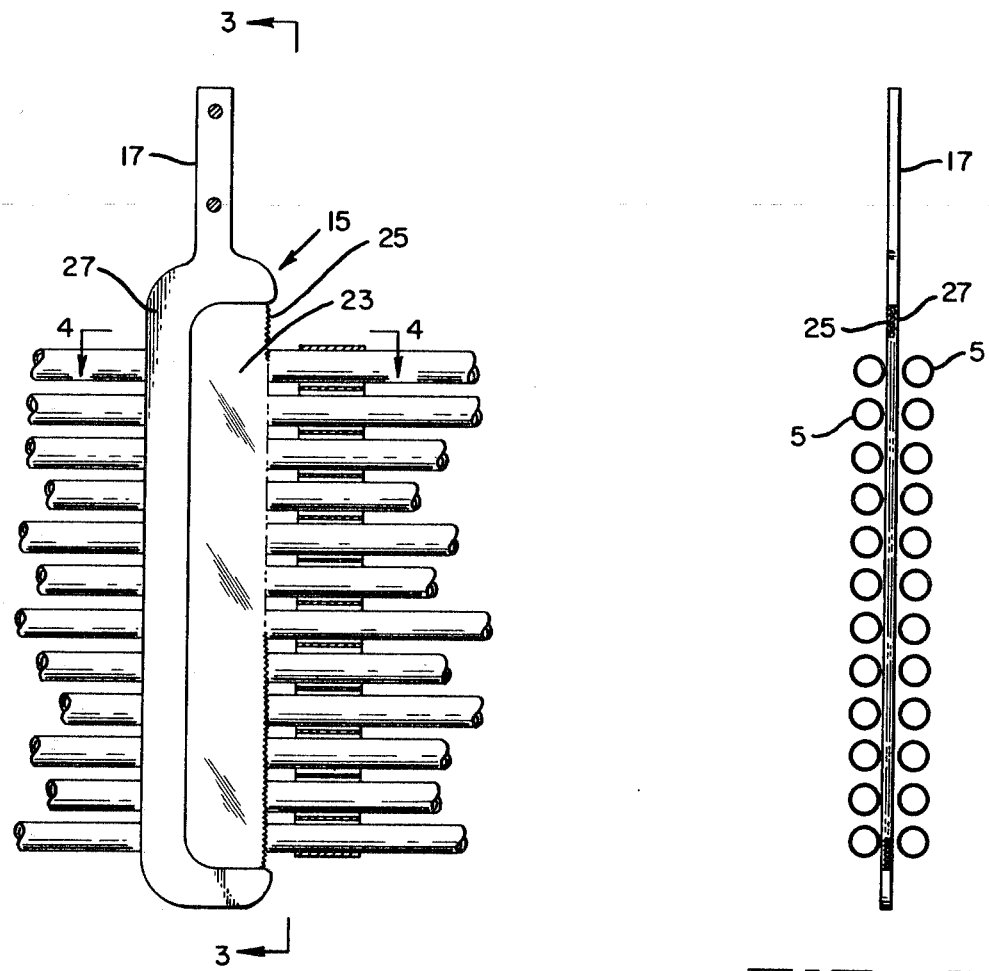
FIG_2.
FIG_3.
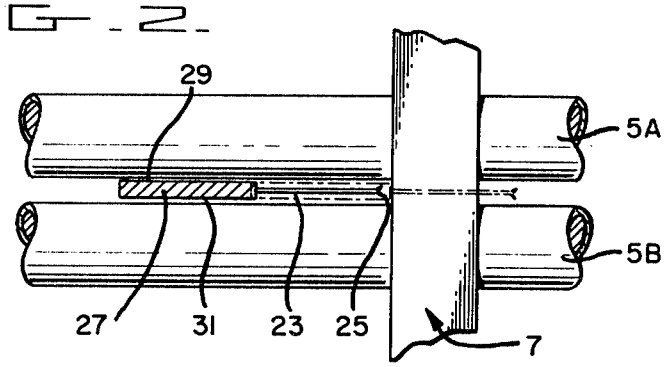
FIG_4.

United States Patent Office 3,514,838
Patented June 2, 1970

3,514,838
METHOD OF SEVERING A NUCLEAR FUEL BUNDLE
Robert M. Freeborg, Lafayette, Calif., assignor, by mesne assignments, to Bechtel International Corporation, San Francisco, Calif., a corporation of Delaware
Filed July 15, 1966, Ser. No. 565,465
Int. Cl. B23p *19/00*
U.S. Cl. 29—426                    2 Claims This invention relates to a method of mechanically disassembling large size bundles of nuclear reactor fuel. Such fuels are ordinarily confined in long, thin tubes of stainless steel and a plurality of such tubes are held in a rectangular bundle. Periodically it is necessary to reprocess a fuel of this type and for this purpose it is necessary to chop the long elements into a series of small pieces so that the fuel can be leached from the several segments of tube. The pieces must be small and reasonably uniform in order to expose the optimum quantities of fuel in the dissolver for economical dissolution. Such fuel tubes may be cut most efficiently by severing the entire fuel assembly containing clusters of tubes utilizing a shear. However, since the material contained therein is highly radioactive, this must be done by remote control equipment acting in heavily shielded rooms. Such shears as now exist for this purpose have a small throat capacity, well under the maximum size of modern and future fuel bundles. For instance, in one present development the fuel bundles comprise a plurality of tubes combined into a bundle which is ten inches on each side. Since the largest shears now available for this usage are slightly over six inches square, these relatively large bundles cannot be handled on existing equipment. Further, when one attempts to sever a large number of tubes, they tend to lay over or bend over each other in the cleaving stroke of the shear blade, resulting in inefficient shearing and bending of the tubes rather than clean shearing action. In addition, when large numbers of tubes are sheared with a single cleavage action, there is a tendency for the ends of the tube to be folded over reducing the contact of the acid with the fuel oxide.

Since it would be very expensive to develop larger shears because of the extreme environmental design considerations, the amount of shielding necessary and the required capability of "remote" operation and maintenance, it is much more economical to provide a means of segmenting the fuel bundles into a plurality of small bundles so that they can be efficiently sheared on existing equipment.

An object of this invention is to provide a method whereby the tube bundles can be severed so that a relatively large bundle of tubes can be severed in segments each of which segments can be handled by existing shear equipment.

Still another object of this invention is to provide a saw and method of utilizing the same which is substantially foolproof and self-guiding in its operation so that it can be efficiently utilized by remote control equipment within a shielded room which human beings cannot enter.

In the drawings forming part of this application:

FIG. 2 is an enlarged side view showing the saw blade of the present invention in the process of severing a bundle of tubes;

FIG. 3 is a section on the line 3—3 of FIG. 2;

FIG. 4 is an enlarged plan view on the line 4—4 of FIG. 2;

Figure 1A:
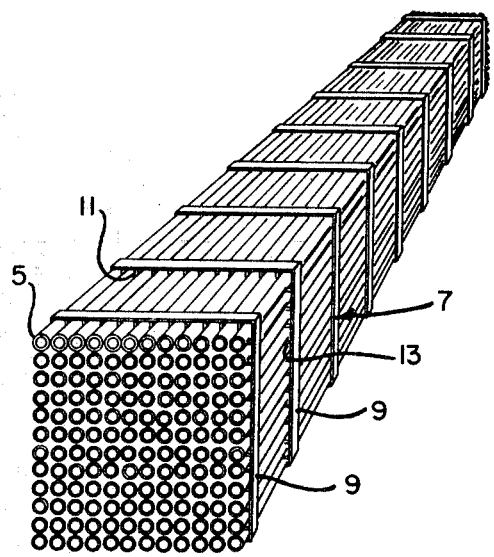
FIG. 1A is a perspective view of a typical tube bundle of nuclear reactor fuel.
Figure 1B:
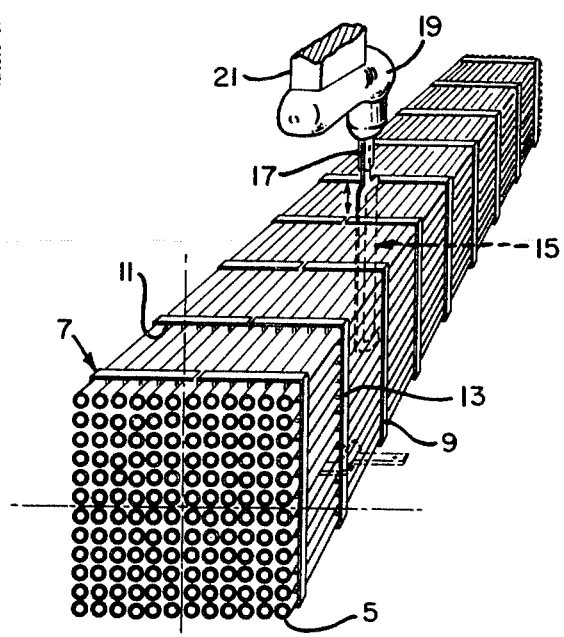
FIG. 1B is a similar perspective view showing the method by which the bundle is severed into quarters.

Referring now to the drawings by reference characters there is shown a plurality of fuel tubes 5 held by a series of spaced tube support members 7. The tube support members 7 include not only an outer band 9 but also vertical members 11 and horizontal members 13 so that each tube is securely held in a crib-like structure. Although not illustrated, crimping or fingers may be employed to hold the tubes in exact spaced relationship. In order to practice the present invention, a unique form of saber saw blade, which is best shown in FIGS. 2 through 4, is employed. The saber saw blade has been generally designated 15 and includes a tang 17 which is adapted to be engaged by saber saw mechanism 19 which in turn may be connected to a remote control arm 21 or, the fuel may be advanced toward a stationary mounted saw mechanism, so that the structure may be utilized within a radioactive enclosure. The saw structure includes a blade proper 23 having a plurality of teeth 25 thereon. A backing member 27 is also employed and it will be noted that with reference to FIG. 4, that the backing member 27 has substantially parallel side walls 29 and 31 which have a substantial width so that they tend to hold the saw centered between adjacent tubes as at 5A and 5B. It will also be noted that the back 27 has a substantial width so that it is wider than the thickness of either the blade 23 or even the teeth 25 if the teeth have a set. Instead of conventional saw teeth having a set, other forms of teeth can be employed as on a file or broach, which teeth would not be set.

Referring now specifically to FIGS. 1A through 1D, the saw is employed to sever the bundle shown in 1A. In one embodiment of the invention the saw first makes a vertical cut as is shown in solid lines in FIG. 1B and then makes a horizontal cut as is shown in dot-dash lines in FIG. 1B.

Figure 1C:
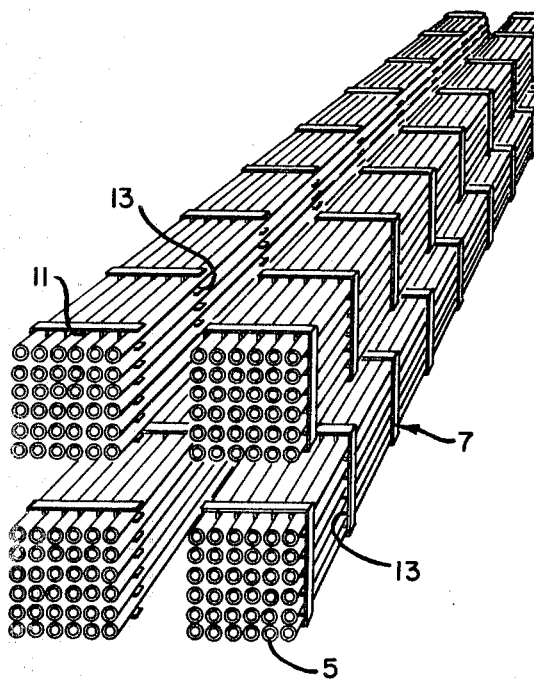
FIG. 1C is a perspective view of the bundle shown in FIG. 1A severed into quarters.
Figure 1D:
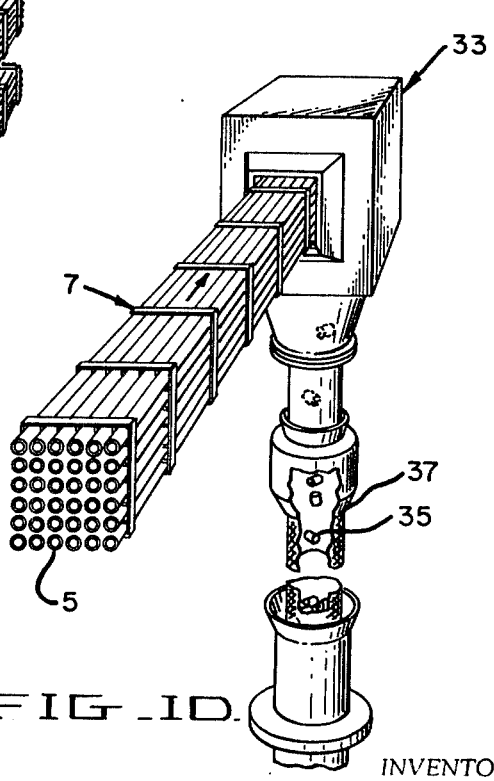
FIG. 1D is a perspective view showing the method of shearing the quartered sections into relatively small pieces.

In accordance with another embodiment of the invention, the saw stays in a fixed position and the bundle is rotated 90° between passes. Because of blade shape, it cannot pass directly along length of fuel in one pass. Blade 23 makes a "plunge cut" thereby severing grid 7, however backing piece 27 acts as a stop. The blade must ordinarily then be withdrawn from the fuel bundle and advanced to the next grid position for a repeat operation. The saw moves to the position shown in phantom in FIG. 4 and thus severs the tube bundle into four small bundles as is shown in FIG. 1C. Because of vertical support members 11 and horizontal support members 13 which pass between all of the tubes, the tubes will still be held in alignment so that each of the quarters can be handled as a unit by remote control equipment without the tubes falling apart. As is shown in FIG. 1D, one of the quartered tube bundles is now passed into the throat of a relatively small shear generally designated 33 wherein the fuel reactor tubes can be severed into a series of small pieces 35 whereupon they fall onto a suitable dust tight receptacle or basket 37 and can thus be transported to an acid dissolving bath.

It is believed apparent from the foregoing that I have provided a novel form of saber saw blade suitable for severing relatively large bundles of nuclear reactor fuel tube bundles and also a method of severing such bundles whereby the large bundles are safely severed into a plurality of small bundles without danger of cutting into the tubes and thus releasing the radioactive content thereof prematurely.

I claim:

1. The method of severing a bundle of long, parallel articles wherein said bundle is retained by a plurality of spaced support frames surrounding the articles comprising providing a saw blade having a thick back thereon, said back being substantially thicker than the said blade, severing said frame by passing said blade between said articles whereby said back tends to separate the articles and prevent the cutting edge of the blade from contacting said articles whereby the cutting edge of said blade severs the support frame and separates the articles without the articles themselves being damaged.

2. The method of claim 1 wherein the articles comprise tubes of nuclear fuel.

References Cited

UNITED STATES PATENTS

| | | | |
|---|---|---|---|
| 1,917,889 | 7/1933 | Jacques | 30—273 |
| 2,049,823 | 8/1936 | Reichert | 30—273 |
| 2,064,261 | 12/1936 | Howe et al. | 143—133 |
| 2,200,746 | 5/1940 | Hoskwith | 30—273 |
| 2,429,888 | 10/1947 | Moore. | |
| 2,820,282 | 1/1958 | Schneider. | |
| 3,001,287 | 9/1961 | Rochovich | 30—355 |
| 3,110,099 | 11/1963 | Murphy | 29—426 |
| 2,908,971 | 10/1959 | Thomas | 143—68 X |
| 3,225,443 | 12/1965 | Young | 83—924 X |

CHARLIE T. MOON, Primary Examiner

U.S. Cl. X.R.

30—355; 83—647; 143—133; 176—78